(12) United States Patent
Dumitrescu et al.

(10) Patent No.: US 11,340,136 B2
(45) Date of Patent: May 24, 2022

(54) APPARATUS FOR DETECTING A MODULATION TRANSFER FUNCTION AND CENTERING OF AN OPTICAL SYSTEM

(71) Applicant: Trioptics GmbH, Wedel (DE)

(72) Inventors: Eugen Dumitrescu, Wedel (DE); Patrik Langehanenberg, Wedel (DE); Iris Erichsen, Hetlingen (DE); Alexander Bai, Bremen (DE); Simon Zilian, Hamburg (DE); Aiko Ruprecht, Hamburg (DE)

(73) Assignee: Trioptics GmbH, Wedel (DE)

( * ) Notice: Subject to any disclaimer, the term of this patent is extended or adjusted under 35 U.S.C. 154(b) by 0 days.

(21) Appl. No.: 17/179,177

(22) Filed: Feb. 18, 2021

(65) Prior Publication Data

US 2021/0181058 A1 Jun. 17, 2021

Related U.S. Application Data

(63) Continuation-in-part of application No. 15/990,764, filed on May 28, 2018, now Pat. No. 10,942,087.

(30) Foreign Application Priority Data

Jun. 2, 2017 (EP) ..................................... 17174143

(51) Int. Cl.
*G01M 11/02* (2006.01)
*G02B 7/04* (2021.01)
*G02B 13/00* (2006.01)

(52) U.S. Cl.
CPC .... *G01M 11/0292* (2013.01); *G01M 11/0207* (2013.01); *G02B 7/04* (2013.01); *G02B 13/001* (2013.01)

(58) Field of Classification Search
CPC ......... G01M 11/0292; G01M 11/0207; G01M 11/0221; G01M 11/0214; G02B 7/005
See application file for complete search history.

(56) References Cited

U.S. PATENT DOCUMENTS

| 6,346,981 B1 | 2/2002 | Karbe et al. |
| 2004/0109243 A1 | 6/2004 | Orimo et al. |
| 2005/0100244 A1 | 5/2005 | Wang et al. |

(Continued)

FOREIGN PATENT DOCUMENTS

| CN | 1877282 A | 12/2006 |
| CN | 101650167 A | 2/2010 |

(Continued)

OTHER PUBLICATIONS

Winters, Daniel, "Image Quality Testing Improves as Cameras Advance," Photonics Spectra, Jan. 2014, p. 1-7, vol. 31, Photonics Media, USA.

(Continued)

*Primary Examiner* — Michael P LaPage
(74) *Attorney, Agent, or Firm* — Rankin, Hill & Clark LLP

(57) ABSTRACT

The invention relates to an apparatus (2) for detecting imaging quality of an optical system (4) with at least one lens (6) or lens group. The apparatus (2) includes an MTF measuring apparatus (10) for measuring a modulation transfer function at a plurality of field points in the field of view of the optical system (4), and a centering measuring apparatus (18) for measuring a centered state of the optical system (4).

12 Claims, 5 Drawing Sheets

(56) References Cited

U.S. PATENT DOCUMENTS

| | | | |
|---|---|---|---|
| 2007/0268453 A1 | 11/2007 | Hong et al. | |
| 2011/0013027 A1 | 1/2011 | Shibata et al. | |
| 2012/0015460 A1* | 1/2012 | Donaher | G03F 7/70666 |
| | | | 438/16 |
| 2012/0015461 A1 | 1/2012 | Donaher et al. | |
| 2012/0113413 A1 | 5/2012 | Miahczylowicz-Wolski et al. | |
| 2014/0002674 A1 | 1/2014 | Duparre et al. | |
| 2015/0009492 A1 | 1/2015 | Frese et al. | |
| 2016/0094841 A1 | 3/2016 | Wang et al. | |
| 2016/0127637 A1* | 5/2016 | Takao | G02B 27/0068 |
| | | | 348/208.12 |
| 2016/0334600 A1 | 11/2016 | Brodie et al. | |
| 2017/0184815 A1 | 6/2017 | Wang et al. | |
| 2018/0238769 A1 | 8/2018 | Ikawa et al. | |

FOREIGN PATENT DOCUMENTS

| | | |
|---|---|---|
| CN | 104204952 A | 12/2014 |
| CN | 105675266 A | 6/2016 |
| CN | 106768899 A | 5/2017 |
| DE | 102004029735 A1 | 1/2006 |
| DE | 102014001151 A1 | 8/2015 |
| EP | 3037800 A1 | 6/2016 |

OTHER PUBLICATIONS

Gross, Herbert, "Testing the Geometry of Optical Components," Handbook of Optical Systems, 2012, p. 680-783, vol. 5, Wiley-VCH Verlag GmbH & Co. KGaA, Germany.

Sadoulei, Sammuel, "Optics Testing: MTF quickly characterizes the performance of imaging systems," Laser Focus World, Mar. 1, 2006, p. 1-6, vol. 42 issue 3, PennWell Corp. USA.

* cited by examiner

APPARATUS FOR DETECTING A MODULATION TRANSFER FUNCTION AND CENTERING OF AN OPTICAL SYSTEM

CROSS-REFERENCE TO RELATED APPLICATIONS

This application is a continuation-in-part of application Ser. No. 15/990,764, filed May 28, 2018, now U.S. Pat. No. 10,942,087 B2, and claims priority to EP 17 174 143.2, filed Jun. 2, 2017.

BACKGROUND OF INVENTION

Field of Invention

The invention relates to an apparatus for detecting imaging quality of an optical system with at least one lens or lens group. Furthermore, the invention relates to a method for detecting imaging quality of an optical system, comprising at least one lens or lens group, having such an apparatus.

Brief Description of Related Art

In the production of high-quality multi-lens optical systems, the individual lenses must be aligned very precisely relative to each other. Also in the production of camera modules as for example described in Brodie et al., Pub. No. US 2016/0334600 A1, it is necessary to correctly align and center the optical elements relative to each other and with reference to the image sensor.

To perform a correct alignment of the lenses in an optical system, it is necessary to establish a position of the optical surface by measurement. In this context, the position of the center of curvature of the optical surface is an important parameter. In an ideal situation, in multi-lens systems, the center of curvature of the individual optical surfaces are located precisely on a common reference axis that coincides with the axes of symmetry of the lens mounts accommodating the lenses. In real optical systems, this state can however not be achieved due to production and installation tolerances. The centers of curvature are statistically distributed around the reference axis. If the distances between the centers of curvature and the reference axis are too large, the optical properties of the optical system undesirably degrade.

From Heinisch et al., DE 10 2014 001 151 A1, a method is known for measuring the positions of centers of curvature of optical surfaces of a multi-lens optical system. With an optical angle measuring device, an angle, or respectively an offset between a surface normal of an optical surface and an axis of rotation, is detected at one measurement point. The angle measuring device is then rotated about this axis of rotation, and the angle measurement is repeated.

The centering of an optical system is, however, only one feature that characterizes the quality of the optical system. In particular for mass production, a system is desirable by means of which both the centering of lenses or lens groups can be checked or detected, and the imaging performance of the optical system can also be characterized.

BRIEF SUMMARY OF THE INVENTION

It is an object of the invention to present an apparatus for detecting imaging quality of an optical system, as well as a method for detecting imaging quality of an optical system that is enhanced with respect to the prior art.

The object is solved by an apparatus for detecting imaging quality of an optical system with at least one lens or lens group, wherein the apparatus is further developed with an MTF measuring apparatus for measuring a modulation transfer function at a plurality of field points in the field of view of the optical system, wherein the MTF measuring apparatus is configured to perform a plurality of off-axis MTF measurements, and a centering measuring apparatus to measure a centered state of the optical system that is arranged on-axis.

The lens group is for example a plurality of individual lenses that together form an optical system such as an objective. Likewise, the lens group can be a lens composed of a plurality of lenses such as an achromatic lens.

Advantageously, both the imaging performance as well as the centering of the optical system can be measured with the apparatus according to the invention in particular simultaneously by means of one or more, furthermore simultaneously performed, MTF measurement(s). In particular, this allows to perform a subsequent fine adjustment to optimize the imaging performance based on a rough adjustment based on the measuring results of the centering measuring apparatus. Furthermore, the combination of an MTF measurement and centering measuring apparatus is in particular suitable for mass production since a plurality of parameters of the optical system can be detected quickly and efficiently.

The MTF measurement at a plurality of field points in the field of view of the optical system is carried out for example by evaluating a spatially extended test pattern in the context of the MTF analysis.

According to one embodiment, the apparatus is advantageously further developed by a centering apparatus that comprises an actuator configured to actively center the at least one lens or lens group upon receipt of signals from a processor.

In the context of the present specification, "off-axis" is understood to be an arrangement of the relevant unit in which it is located in the field of view of the optical system, but is however not arranged on the axis of symmetry or centering axis of the optical system. "On-axis" is understood to be an arrangement in which the relevant unit is arranged in the field of view and at least approximately on the axis of symmetry or centering axis of the optical system.

The MTF measuring apparatus and the centering measuring apparatus are for example arranged on a common dome.

With the aid of the MTF measuring apparatus arranged off-axis, MTF measurements can be carried out at various field points in the field of view of the optical system. The MTF measuring apparatus can be easily arranged off-axis. The centering measuring apparatus is however advantageously arranged on-axis. By the combination of an MTF measuring apparatus that is arranged off-axis and a centering measuring apparatus being arranged on-axis, a particularly compact apparatus can be presented.

The apparatus for detecting imaging quality of an optical system is furthermore advantageously further developed in that the centering measuring apparatus comprises an auto-collimator and is configured to measure a center of curvature of at least one optical surface of the optical system in reflection.

By using the position of the center of curvature of the optical surface of at least one optical element, such as a lens, of the optical system, the centered state of the optical system can be inferred. Further details in this regard can be found in e.g. Heinisch et al., DE 10 2014 001 151 A1, by the same applicant.

Such an apparatus is for example furthermore developed by one or more of the following features a) to f):

a) The apparatus also comprises a rotatable seat by means of which the optical system can be rotated about a centering axis (e.g., the optical system to be tested is placed on a motorized chuck with an air bearing).

b) The autocollimator is also configured to be rotatable. For example, it is seated in a holder such that the autocollimator can be rotated as a whole about the axis of symmetry (e.g., the autocollimator is accommodated by roller bearings and its rotation is actuated by a friction drive). In an optional embodiment the autocollimator can be configured in such way that only a part of its optical system, e.g. the focusing lens, is rotatable.

c) The autocollimator comprises a focusing optical system by means of which a focal point can be shifted.

Instead of the axis of rotation, an optical axis can also be used as an alternative reference along which focusing is achieved. In this case, a range is not evaluated on the detector; instead, absolute positions are compared. Focusing can be realized for example by moving the focusing optics of the autocollimator along a linear axis.

d) The autocollimator comprises a focusing optical system, wherein this focusing optical system, or parts thereof, can be rotated about the centering axis (e.g., this can be achieved by applying the friction drive only to the rotatable parts instead of the autocollimator as a whole).

In comparison to the rotation of the autocollimator as a whole, the rotation of a focusing optical system of the autocollimator constitutes a mechanical simplification.

e) An inverting reflective prism, in particular a dove prism, is arranged in a beam path between the autocollimator and the optical system, wherein this prism can be rotated about the centering axis (e.g., the prism is placed in an air bearing and actuated by a suitable mechanical drive).

The inverting reflective prism can be provided alternatively or in addition to the rotation of the autocollimator as a whole, or to the rotation of a focusing optical system of the autocollimator. The optimum combination of the required measures can be arrived at depending on the application.

f) The autocollimator is configured to simultaneously measure the centers of curvature of a plurality of optical surfaces of the optical system.

By the simultaneous detection of a plurality of centers of curvature of two or more optical surfaces of an imaging optical system, particularly fast measurement can be accomplished. Further technical details in this regard are for example mentioned in Oya, et al., EP 3 037 800 A1, by the same applicant.

The aforementioned features a) to f) can each be realized individually by themselves. It is also possible for the technical measures mentioned in features a) to f) to be combined with each other.

The aforementioned embodiments all relate to the characterization of the optical system with regard to its centering by means of a measurement performed in reflection.

According to additional advantageous embodiments, the apparatus is also configured to perform a centering measuring apparatus in transmission.

For example, the apparatus is further developed in that an image sensor is arranged in an image plane of the optical system. A processing unit is configured to read out the image sensor. The MTF measuring apparatus comprises at least one reticle on which there is a test pattern in each case. The optical system images this at least one test pattern on the image sensor. And the processing unit is configured to evaluate the associated image data from the image sensor of the optical system to determine the modulation transfer function.

For example, the image sensor is a part of the optical system. The optical system is furthermore a camera module, for example.

Such an apparatus is in particular suitable for mass tests of camera modules. Advantageously, both an MTF measurement for characterizing the optical quality as well as a centering measurement can be carried out, e.g. simultaneously. If applicable, an additional adjustment/centering of the optical system can be performed to improve/optimize its image quality based on the measured values of the centering measurement. In the context of the invention the centering of an optical system means the centering of different parts of such a system, e.g. lenses or lens groups, relative to one another and not the alignment of an optical system relative to an image sensor.

According to another advantageous embodiment, the apparatus is further developed such that a reticle on which there is a test pattern is arranged in the image plane of the optical system. The optical system images the test pattern. The MTF measuring apparatus is configured to evaluate an image of the test pattern to measure the modulation transfer function of the optical system.

Advantageously, the test pattern is used both for the MTF measurement as well as for the centering measurement. This simplifies the design of the apparatus.

The apparatus for detecting the imaging quality of an optical system is also further developed e.g. in that the reticle comprises a pinhole aperture that constitutes a point light source in the image plane of the optical system. To this purpose, e.g. corresponding lighting is provided behind the reticle or the pinhole aperture. To this purpose, the pinhole aperture has for example a cutout in which an optical system is used for focusing in order to generate the desired point light source. It is also possible to select the pinhole aperture to be correspondingly small so that an even illumination also provides the desired point light source in the plane of the reticle. The centering measuring apparatus comprises a wavefront sensor that is configured to detect a wave front of the image of the point light source from the optical system.

The wavefront sensor is for example a Shack-Hartmann sensor.

According to another embodiment, the centering measuring apparatus comprises an image sensor. The optical system directly images the test pattern on the image sensor, and the centering measuring apparatus is configured to evaluate the centering status, in particular a center of curvature of an optical surface, of the optical system using the position of the image of the test pattern.

It is in particular possible for the image sensor to be provided with an objective with a long focal length (teleobjective), and then the centering measurement is performed. In this case the long focal length of the objective serves as a lever for the centering measurement, wherein the optical system can be adjusted to focus on infinity.

This embodiment is in particular further developed in that a rotatable additional seat is comprised that is configured to rotate the optical system about a centering axis. The seat can be realized as a barrel with a suitable bearing to accommodate the optical system. An example can be a ring knife-edge with rotation air bearing. The rotation can be carried out by means of a suitable mechanical drive (e.g., a friction drive).

In some embodiments, the reticle provides a test pattern for the MTF measurement and a point light source for the centering measurement. In particular, the test pattern on the reticle and the pinhole aperture in the reticle are optionally illuminated with different light sources, which are designed to be sequentially switchable. This makes it possible, for example, to measure the wavefront without interference.

According to another embodiment, the image sensor or the reticle is/are movably seated along an optical axis of the optical system. In such embodiment, the detector is moved along the optical axis by a motorized linear stage, and thus the lever for the centering measurement can be enlarged or reduced. It is also possible to generate a focus spot on the detector.

According to another embodiment, the apparatus is further developed in that the centering measuring apparatus is configured to measure, in a first step, a first centered state, in particular a first center of curvature of a first optical surface, of a first optical element of the optical system, optionally to actively center the first optical element based on the data on this first centered state. The centering measuring apparatus is furthermore configured to then measure a second centered state, in particular a second center of curvature of a second optical surface, of a second optical element of the optical system and then, based on the data on the first centered state and/or the data on the second centered state, to actively center the first and second optical element relative to each other. Active centering can be accomplished by moving one or both of the first and second optical element relative to each other with actuators, which are under the control of the processor. Furthermore, there is in particular a mechanical feed for the second optical element by means of which the second optical element can be added to the optical system after the detection of the centered state of the first optical element. The mechanical feed can be realized e.g. by using a micro gripper to add the second lens to the optical system. The lens to be added can be taken from a stock.

Such an apparatus is particularly well-suited to automatically perform a centering of a multi-lens optical system.

The object is moreover achieved by a method for detecting imaging quality of an optical system comprising at least one lens or lens group, with an apparatus according to one or more of the aforementioned embodiments. The method is further developed in that:

A centered state of the optical system is determined with the centering measuring apparatus, the optical system is centered based on the data on the centered state, and then a modulation transfer function of the optical system is performed by the MTF measuring apparatus at a plurality of field points in the field of view of the optical system.

With such a method, it is possible to improve/optimize the optical imaging quality of the optical system based on the results of the centering measurement. Subsequently performing an MTF measurement makes it possible, for example within the context of quality assurance, to quantify the optical imaging quality of the optical system.

Moreover, the same or similar advantages apply to the method as already mentioned with regard to the apparatus for detecting imaging quality of an optical system. Thus, repetitions will therefore be omitted.

According to an advantageous embodiment, the method is further developed in that in a first step, a first centered state, in particular a first center of curvature of a first optical surface, of a first optical element of the optical system is measured with the centering measuring apparatus, optionally the first optical element is centered based on the data on this first centered state, and then a second centered state, in particular a second center of curvature of a second optical surface, of a second optical element of the optical system is measured with the centering measuring apparatus, and then based on the data on the first centered state and/or the data on the second centered state, the first and second optical elements are centered relative to each other. Centering is accomplished using actuators under the control of a processor.

Optionally, the second optical element is added to the optical system after the detection the centered state of the first optical element.

The centering is therefore not necessarily carried out relative to the centering axis of the measuring system but rather so that the lenses are centered relative to each other.

A centered state is for example detected by ascertaining a center of curvature of at least one of the optical surfaces of at least one optical element of the optical system. The deviation of the center of curvature from a centering axis quantifies the quality of centering in this context.

With the assistance of this method, it is for example possible to produce an optical system of a very high quality since it is checked and optimized during the production process with regard to its centering.

According to an advantageous further development of the method, a tilt of an image plane of the optical system is determined based on the data on the modulation transfer function ascertained with the MTF measuring apparatus at a plurality of field points of the optical system, wherein the optical system is aligned based on the data on the tilt of the image plane of the optical system such that the image plane is at least approximately oriented perpendicular to a centering axis, and wherein at least one center of curvature of at least one optical surface of the optical system is then again measured with the centering measuring apparatus, and the optical system is centered based on this data.

In other words, the MTF measurement is used in an iterative method in order to determine a tilt of the image plane. The optical system is tilted in order to obtain a straight image plane, and then the centering process is repeated.

According to another advantageous embodiment, the method is developed in that (i) a modulation transfer function of the optical system is determined with the MTF measuring apparatus, (ii) then a position of an optical element is changed slightly, in particular stochastically, and then a modulation transfer function of the optical system is again determined with the MTF measuring apparatus, wherein steps (i) and (ii) are repeated iteratively until the modulation transfer function assumes a local maximum value.

In other words, the lens positions of an optical system are varied slightly in order to find a position in which the best MTF results are obtained.

The object is further solved by an apparatus for detecting imaging quality of an optical system, comprising: an MTF measuring apparatus configured to measure a modulation transfer function at a plurality of field points in an imaging field of the optical system, wherein the MTF measuring apparatus is configured to perform a plurality of off-axis MTF measurements; a centering measuring apparatus that is arranged on-axis that is configured to measure and determine a first centered state of a center of curvature of a first optical surface of a first optical element of the optical system and then measure and determine a second centered state of a center of curvature of a second optical surface of a second optical element of the optical system that is added to the optical system after measurement and determination of the first centered state of the first optical element; and a centering apparatus configured to actively center the first optical element and the second optical element relative to each other by displacement perpendicular to a centering axis of the optical system based on the measurements and determinations made by the centering measuring apparatus relating to the first centered state of the first optical element and the second centered state of the second optical element; wherein the centering measuring apparatus comprises an autocollimator, and wherein the centering measuring apparatus is configured to measure the first center of curvature of the first optical surface of the first optical element of the optical system in reflection. The centering apparatus of this apparatus is configured to center the optical elements relative to each based on the measurements and determinations made by the centering measuring apparatus relating to both, the first centered state and the second centered state.

According to another advantageous embodiment, the centering measuring apparatus is configured to measure and determine the first centered state of the center of curvature of the first optical surface of the first optical element of the optical system, and the centering apparatus is configured to subsequently actively center the first optical element based on data relating to the first centered state of the first optical element and the centering measuring apparatus is configured to then measure and determine the second centered state of the center of curvature of the second optical surface of the second optical element of the optical system. The centering measuring apparatus measures and determines the first centered state. After that, the centering apparatus centers the first optical element. Subsequently, after the first optical element has been centered, the centering measuring apparatus measures and determines the second centered state. This applies to both solutions of the object, namely the apparatus comprising the centering apparatus that is configured to center the optical elements based on the measurements and determinations relating first centered state or the second centered state and to the apparatus comprising the centering apparatus that is configured to center the optical elements based on the measurements and determinations relating to both, the first centered state and the second centered state.

Further features of the invention will become apparent from the description of embodiments according to the invention together with the claims and the included drawings. Embodiments according to the invention can fulfill individual features or a combination of several features.

BRIEF DESCRIPTION OF THE DRAWINGS

The invention is described below, without restricting the general idea of the invention, based on exemplary embodiments in reference to the drawings, wherein we expressly refer to the drawings with regard to all details according to the invention that are not explained in greater detail in the text. In the following.

In the drawings, the same or similar types of elements and/or parts are provided with the same reference numbers so that a re-introduction is omitted.

DETAILED DESCRIPTION OF THE INVENTION

Figure 1:
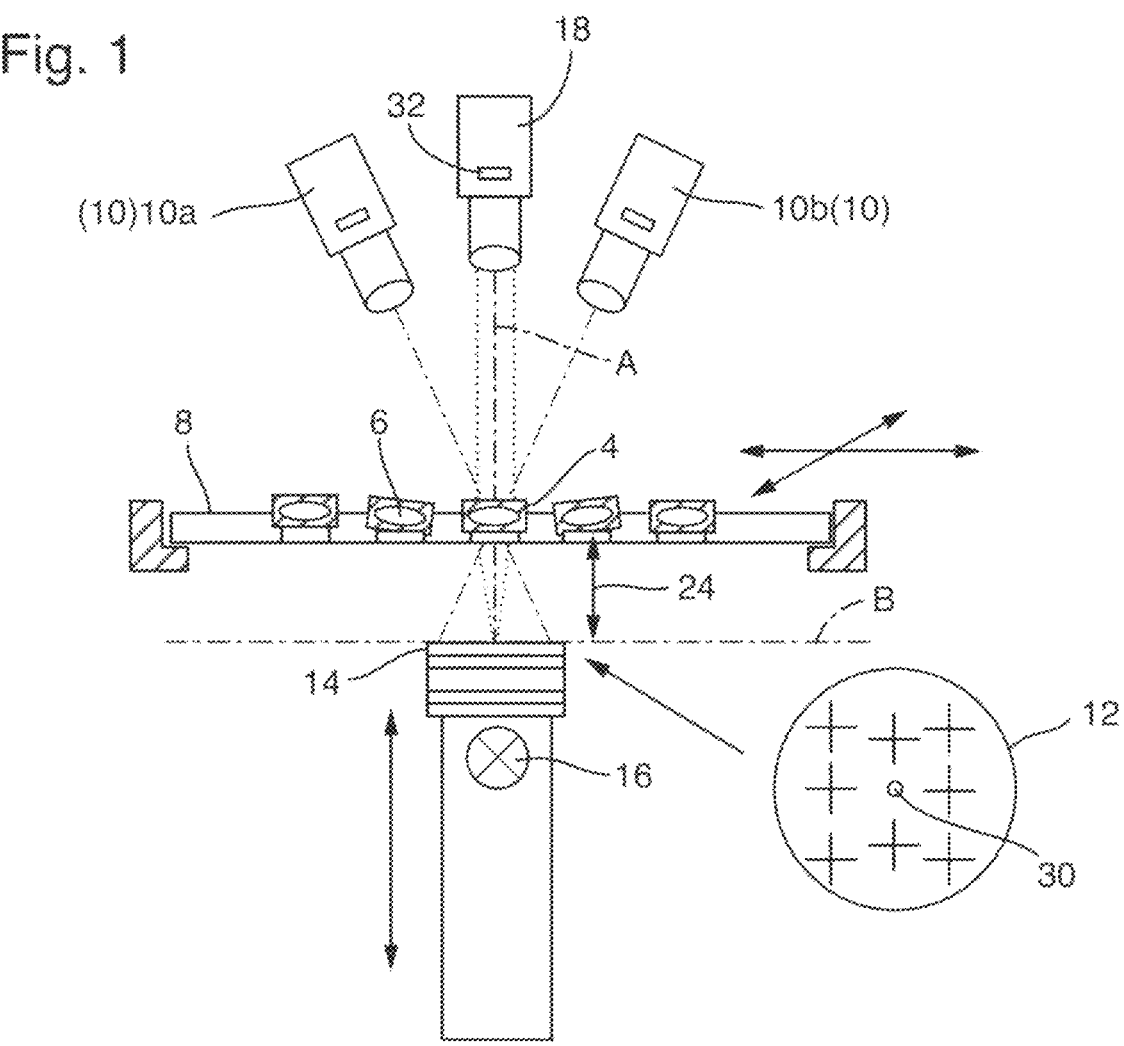
FIG. 1 shows an apparatus for detecting imaging quality of an optical system in a schematic simplified side view.

FIG. 1 shows a schematically simplified side view of an apparatus 2 for detecting imaging quality of an optical system 4. For example, the apparatus 2 is configured to test and/or optimize a plurality of optical systems 4 with regard to their imaging quality, of which only a few are provided with reference signs for reasons of clarity. The optical systems 4 moreover comprise e.g. only a single optical element, i.e., a lens 6. The apparatus 2 shown in FIG. 1 is only provided for example for a mass test of optical systems 4. For this purpose, the optical systems 4 such as camera objectives are seated on a carrier 8 that, as indicated with arrows, can be moved on a plane. Accordingly, the individual optical systems 4 can be checked sequentially in rapid sequence.

The apparatus 2 comprises an MTF measuring apparatus 10 that for example comprises the two measuring apparatus 10a and 10b arranged off-axis. The MTF measuring apparatus 10 is configured to detect a modulation transfer function at a plurality of field points in the field of view of the optical system 4. The measurement of the modulation transfer function at different field points in the field of view of the optical system 4 is already possible due to the off-axis arrangement of the individual MTF measuring apparatus 10a, 10b. In addition, an extended test pattern is used as a test pattern 12, such as the portrayed arrangement of crosses. This also causes the modulation transfer function to be detected at a plurality of different field points in the field of view of the optical system 4. The test pattern 12 is located on a reticle 14; it is for example etched thereinto. The reticle 14 can be illuminated by means of a light source 16 such as a lamp. The reticle 14 is arranged in an image plane B of the optical system 4. The distance identified with reference sign 24 is therefore the back focal length of the optical system 4. The MTF measuring apparatus 10 is configured to perform a plurality of off-axis MTF measurements.

The apparatus 2 also comprises a centering measuring apparatus 18 that for example is arranged on-axis. This means that the centering measuring apparatus 18 is arranged at least approximately on an axis A that corresponds to the desired centering axis of the optical system 4. For example, and highly exaggerated for reasons of better visualization, different centered states of the individual optical systems 4 are portrayed. Obviously, their optical axes do not yet correspond with the desired centering axis A. The centering measuring apparatus 18 serves to measure a centered state of the optical system 4.

With the assistance of the apparatus 2, both a modulation transfer function for characterizing the imaging quality of the optical system 4 can be advantageously recorded, and the centered state of the optical system 4 can also be identified. The imaging quality of the optical system 4 can accordingly be characterized by two measuring methods and measurements that e.g. are preferably detected simultaneously or in rapid sequence. For this reason, the apparatus 2, as indicated in FIG. 1, is particularly suitable for mass tests of optical systems 4.

Optical systems 4 that are frequently subjected to such mass tests are for example camera modules; correspondingly, the optical system 4 is for example a camera module.

The two MTF measuring apparatus 10a, 10b and the centering measuring apparatus 18 are for example arranged on a common dome that is not portrayed in FIG. 1. A particularly compact apparatus 2 can be presented by this arrangement.

FIG. 1 shows an apparatus 2 for detecting imaging quality of an optical system 4 in which a reticle 14 is arranged in the image plane B of the optical system 4. A test pattern 12 is present on this reticle 14. The test pattern 12 consists of the crosses portrayed as an example. Furthermore, the reticle 14 comprises a pinhole aperture 30. The reticle 14 is illuminated by the light source 16, and the pinhole aperture 30 therefore forms a point light source in the image plane B. The optical system 4 images the point light source e.g. into infinity, wherein the arising wave front is detected by a wave front sensor 32, such as a Shack-Hartman sensor. The wave front sensor serves to detect a wave front of the imaging of the point light source by the optical system 4 that is formed in the image plane B by the pinhole aperture 30.

Figure 4:
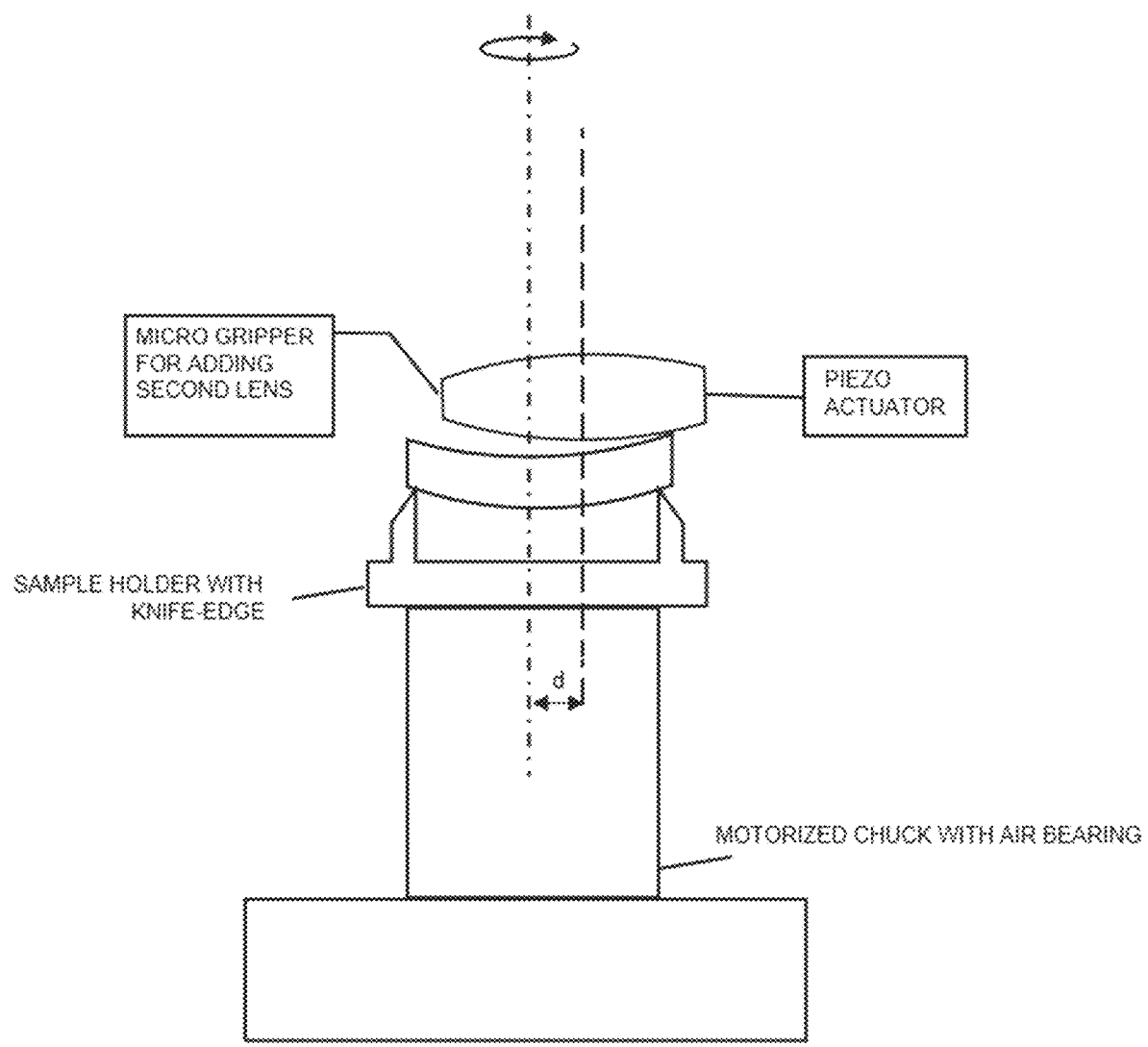
FIG. 4 shows a schematic centering of an optical system comprising two lenses.

Alternately, in particular the centering measuring apparatus 18 comprises an image sensor (not portrayed), and the optical system 4 images the test pattern 12 directly on this image sensor. In this context, furthermore the apparatus 2 comprises e.g. an additional rotatable seat that is configured to rotate the optical system 4 about the centering axis A. The seat can be realized as a ring knife-edge with rotational air bearing (see FIG. 4, which schematically illustrates such an embodiment).

Furthermore, according to another exemplary embodiment, the image sensor and/or the reticle 14 is/are movably seated along the optical axis A of the optical system 4. This movement can be realized by means of a motorized linear stage (movement of the reticle 14 along the optical axis A is indicated by the double-sided arrow on the left side of FIG. 1), The apparatus 2 shown in FIG. 1 for detecting the imaging quality of the optical system 4 works in transmitted light. Likewise, the centering measuring apparatus 18 is configured to work in reflection. To characterize the centered state of the optical system 4, a center of curvature of an optical surface of the optical system 4 is for example measured. For example, the center of curvature of the side of the lens 6 facing the centering measuring apparatus 18 is determined. A deviation of this center of curvature from the centering axis A indicates a value for the centered state of the optical system 4.

With such an apparatus 2, for example the entire centering measuring apparatus 18 can be rotated about the centering axis A. For this, the centering measuring apparatus 18 is seated in a rotatable seat. Likewise, such a centering measuring apparatus 18 comprises an autocollimator 20, wherein this autocollimator 20 is designed to be rotatable. The autocollimator 20 is for example rotatable as a whole about the centering axis A. Furthermore, the autocollimator 20 can comprise a focusing optical system 22, and this focusing optical system 22, or parts thereof, is/are rotatable about the desired centering axis A. The centering measuring apparatus 18 can be rotatably held by known suitable mechanical means such as roller bearings. The rotation of the centering measuring apparatus is mechanically actuated by a friction drive.

Movement of some parts of the apparatus can be accomplished in known ways. For example, as shown in DE 10 2014 001 151 A1 of the same Applicant, which is hereby incorporated by reference, rotation of the autocollimator (see FIG. 5), which is held by roller bearings 51 and which is driven by a friction drive 53, can be controlled by the processing unit (computer 26). As a further option, the front optics of the autocollimator can be rotated (see FIG. 8). In another option, a rotatable prism can be placed in front of the autocollimator (see FIG. 9).

Figures 5A, 5B:
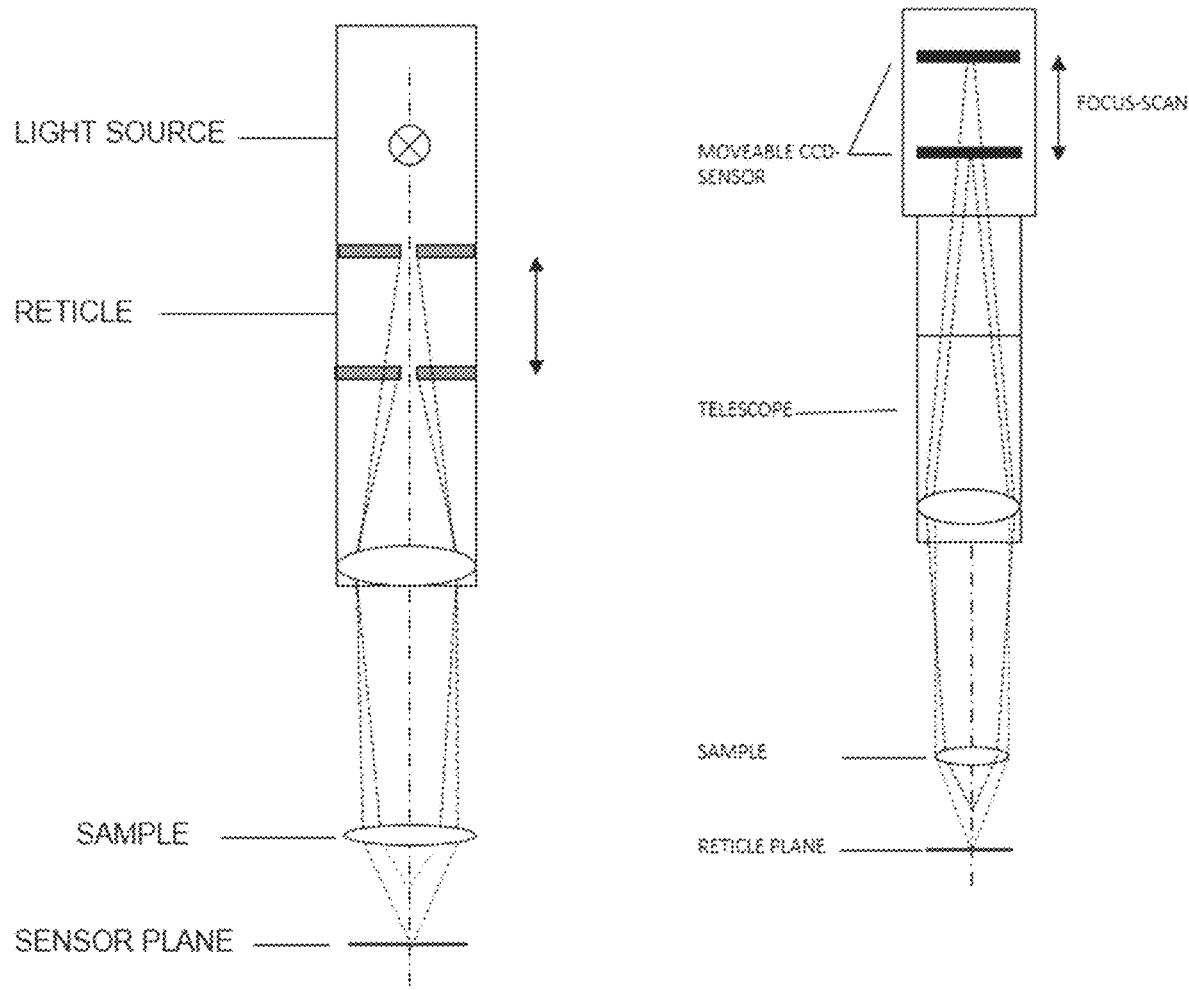
FIGS. 5a) and 5b) schematically illustrate movement of the reticle and the principle of a focusing collimator (FIG. 5a) and movement of the CCD sensor and the principle of a camera with focus adjustment (FIG. 5b), respectively.

FIG. 5a accompanying the present application schematically shows movement of the reticle and the principle of a focusing collimator. FIG. 5b accompanying the present application schematically shows movement of a CCD sensor and the principle of a camera with focus adjustment.

Figure 2:
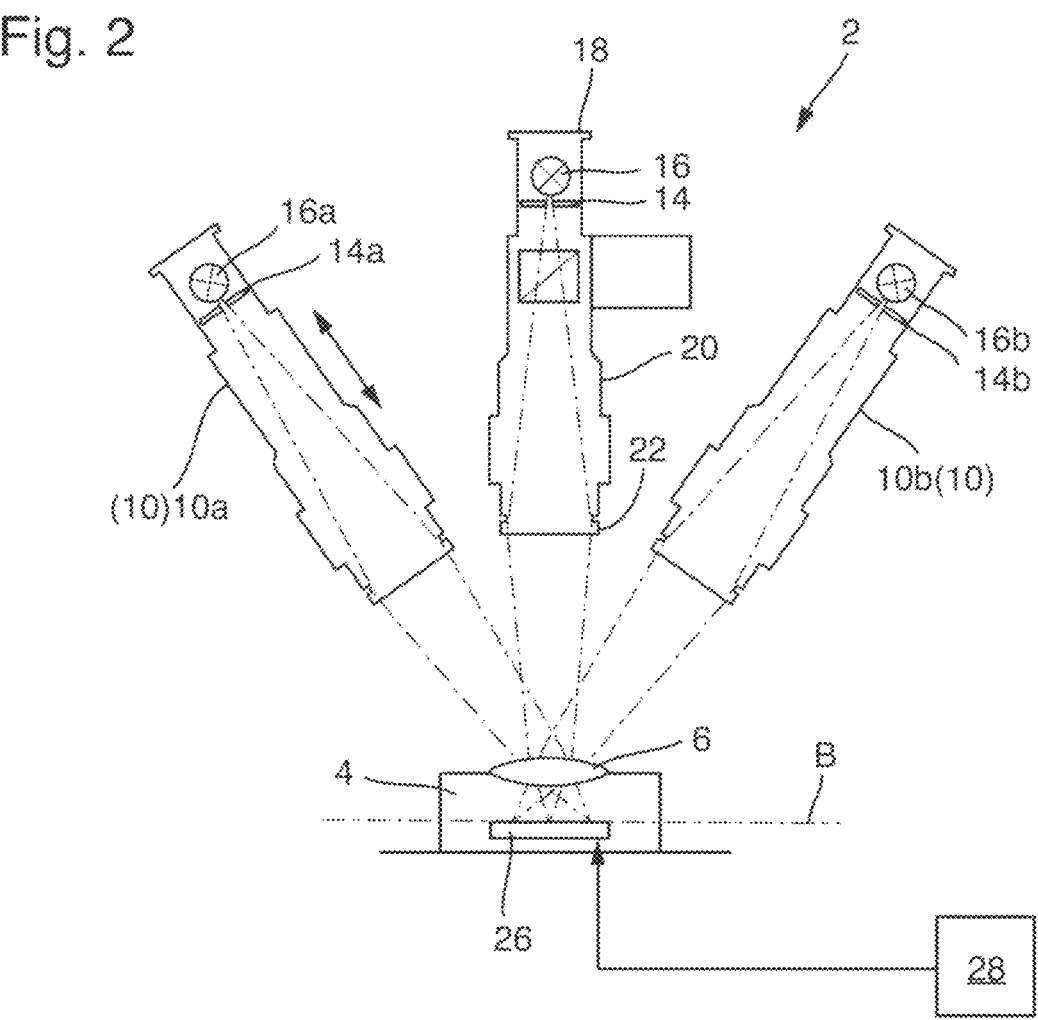
FIG. 2 shows another apparatus for detecting imaging quality of an optical system that comprises an image sensor, and FIGS. 3a) and 3b) show representations of individual exemplary method steps of a method for detecting imaging quality of an optical system comprising a lens group, wherein centering of the lenses of the lens group is performed.

FIG. 2 shows another such apparatus 2 for detecting imaging quality of an optical system 4 that comprises for example a lens 6. The optical system 4 comprises an image sensor 26, for example, the optical system 4 is a camera module. The image sensor 26 is arranged in an image plane B of the optical system 4. The apparatus 2 furthermore comprises a processing unit 28 such as a computer or the like that is configured to read out the image sensor 26. The MTF measuring apparatus 10 that for example consists of the two MTF measuring apparatus 10a and 10b comprises at least one reticle 14. The MTF measuring apparatus 10a comprises a reticle 14a, the MTF measuring apparatus 10b comprises another reticle 14b, on which there is a test pattern 12 in each case. The test patterns 12 on the reticles 14a, 14b are each illuminated by a suitable light source 16a, 16b, and are imaged by the lens 6 on the image sensor 26 of the optical system 4. The processing unit 26 is configured to calculate a modulation transfer function of the lens 6 in different field points in the field of view of the lens 6 from the image data of the images from the reticles 14a, 14b detected by means of the image sensor 26.

Furthermore, an inverting reflective prism such as a dove prism is arranged in a beam path that is indicated in FIG. 2 between an autocollimator 20 and the optical system 4. This prism can for example rotate about the centering axis A. Moreover for example, the autocollimator 20 is configured to simultaneously determine a plurality of centers of curvature of a plurality of optical surfaces of an optical system 4. This is of interest for optical systems 4 that are made from a plurality of optical elements such as a plurality of lenses 6. With such an apparatus 2, a plurality of autocollimators are arranged next to each other, wherein their beam paths are for example coupled with each other by corresponding beam dividers.

The apparatus 4 according to one or more of the aforementioned exemplary embodiments is moreover used in a method for detecting imaging quality of an optical system 4. With such a method, a centered state of the optical system 4 is determined with the assistance of the centering measuring apparatus 18. Based on the data on the centered state of the optical system 4, the optical system 4 is then centered. For example, the data on the position of a center of curvature of at least one optical surface of at least one optical element, such as the lens 6, of the optical system 4 are determined. By using the deviation of the center of curvature from the centering axis A, the centered state of the optical system 4 can be inferred. Then a modulation transfer function of the optical system 4 is performed with the assistance of the MTF measuring apparatus 10 at a plurality of field points in the field of view of the optical system 4.

Figure 3A:
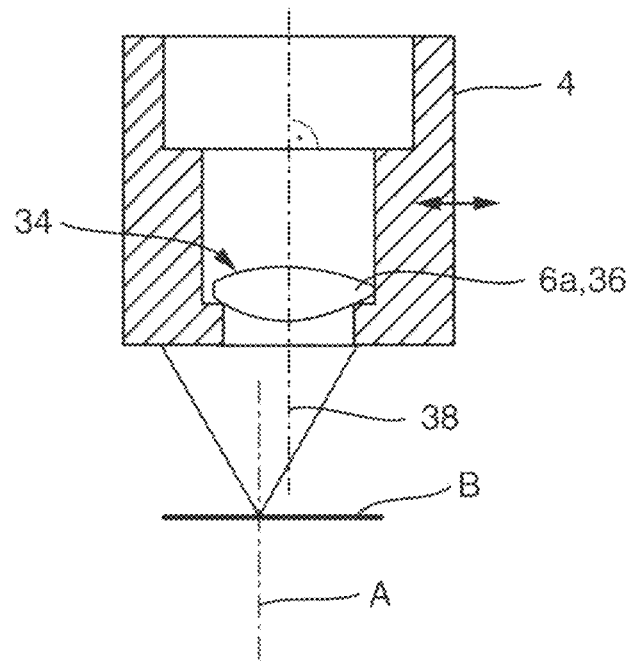

FIGS. 3a) and 3b) show for example two individual method steps of such a method. The optical system 4 comprises for example a first optical element 36 and a second optical element 40. The optical elements 36, 40 are for example a first lens 6a and a second lens 6b. The first optical element 36 comprises a first optical surface 34; the second optical element 40 comprises a second optical surface 42. For example, the centering of the two lenses 6a, 6b relative to each other will be explained with reference to the depicted figures.

Figure 3B:
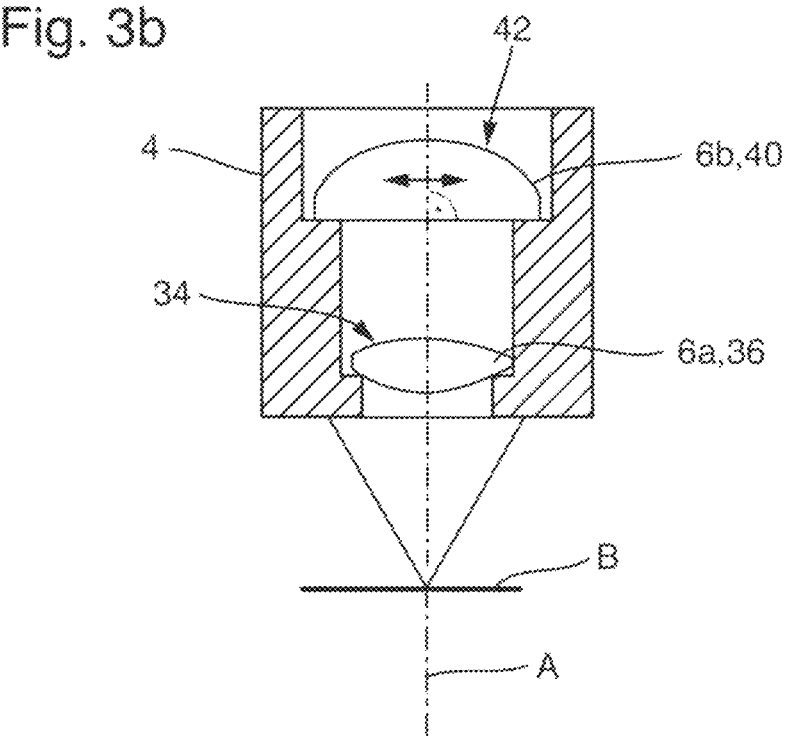

In a first step, a first centered state of the first optical element 36 is detected with the assistance of the centering measuring apparatus 18. This is for example characterized by the position of a first center of curvature of the first optical surface 34. The position of an optical axis 38 of the first optical element 36 can for example be inferred from the position of this center of curvature. Based on this data, such as a deviation of the optical axis 38 from the centering axis A, a centering of the first optical element 36 is performed as indicated in FIG. 3a with a double arrow. Centering with reference to the centering axis A is accordingly carried out by using a piezo actuator (see FIG. 4). FIGS. 3a and 3b show movement of the device under the control of a controller (see processing unit 28 in FIG. 2).

Then a second centered state of the second optical element 40 is ascertained with the centering measuring apparatus 18. Again, the centered state of the second optical element 40 can be inferred for example by using the position of a center of curvature of the second optical surface 42. With reference to a deviation of this second center of curvature from the centering axis A, the first and second optical element 36, 40 can then be centered relative to each other as indicated by the double arrow in FIG. 3b.

According to another exemplary embodiment, a tilt of the image plane B of the optical system 4 is inferred based on the data of the modulation transfer function ascertained by the MTF measuring apparatus 10 at a plurality of field points of the optical system 4. Based on the data on the tilt of the image plane B of the optical system 4, the optical elements of the optical system 4 such as its lenses 6a, 6b are aligned so that the image plane B is orientated at least approximately perpendicular to a centering axis A. Then for example at least one centered state of at least one optical element is measured again by the centering measuring apparatus 18, and the optical system 4 is centered based on this data.

According to another exemplary embodiment, a modulation transfer function of the optical system 4 is determined by the MTF measuring apparatus 10 after the centering process in a first step. Then in a second step, a position of an optical element such as a position of the lenses 6a, 6b is changed slightly, in particular stochastically. Then a modulation transfer function of the optical system 4 is again determined by the MTF measuring apparatus 10. The first step and the second step are repeated iteratively until the modulation transfer function assumes a local maximum value; the optical imaging performance of the optical system 4 is therefore optimized.

All named features, including those taken from the drawings alone and individual features, which are disclosed in combination with other features, are considered alone and in combination as essential for the invention. Embodiments according to the invention can be fulfilled through individual features or a combination of several features. In the context of the invention, features which are designated with "in particular" or "preferably" are to be understood as optional features.

REFERENCE SIGN LIST

2 Apparatus
4 Optical system
6 Lens
8 Carrier
10, 10a, 10b MTF measuring apparatus
12 Test pattern
14, 14a, 14b Graticule
16, 16a, 16b Light source
18 Centering measuring apparatus
20 Autocollimator
22 Focusing optical system
24 Image distance
26 Image sensor
28 Processing unit
30 Pinhole aperture
32 Wavefront sensor
34 First optical surface
36 First optical element
38 First optical axis
40 Second optical element
42 Second optical surface
A Centering axis
B Image plane

What is claimed is:

1. An apparatus for detecting imaging quality of an optical system, comprising:
    an MTF measuring apparatus configured to measure a modulation transfer function at a plurality of field points in an imaging field of the optical system, wherein the MTF measuring apparatus is configured to perform a plurality of off-axis MTF measurements;
    a centering measuring apparatus that is arranged on-axis that is configured to measure and determine a first centered state of a center of curvature of a first optical surface of a first optical element of the optical system and then measure and determine a second centered state of a center of curvature of a second optical surface of a second optical element of the optical system that is added to the optical system after measurement and determination of the first centered state of the first optical element; and
    a centering apparatus configured to actively center the first optical element and the second optical element relative to each other by displacement perpendicular to a centering axis of the optical system based on the measurements and determinations made by the centering measuring apparatus relating to the first centered state of the first optical element or the second centered state of the second optical element;
    wherein the centering measuring apparatus comprises an autocollimator, and
    wherein the centering measuring apparatus is configured to measure the first center of curvature of the first optical surface of the first optical element of the optical system in reflection.

2. The apparatus according to claim 1, wherein the apparatus further comprises a rotatable seat configured to rotate the optical system about the centering axis.

3. The apparatus according to claim 1, wherein the autocollimator is rotatably seated in a holder and the autocollimator is rotatable as a whole about the centering axis.

4. The apparatus according to claim 1, wherein the autocollimator comprises a focusing optical system configured to shift a focal point.

5. The apparatus according to claim 1, wherein the autocollimator comprises a focusing optical system, and wherein the focusing optical system, or parts thereof, are rotatable about a centering axis.

6. The apparatus according to claim 1, wherein the apparatus further comprises an inverting reflective prism, wherein said inverting reflective prism is arranged in a beam path between the autocollimator and the optical system, and wherein said inverting reflective prism is rotatable about the centering axis.

7. The apparatus according to claim 1, wherein the autocollimator is configured to simultaneously measure centers of curvature of a plurality of optical surfaces of the optical system.

8. The apparatus according to claim 1, wherein an image sensor is arranged in an image plane of the optical system, wherein the apparatus further comprises a processing unit configured to read out the image sensor, wherein the MTF measuring apparatus comprises at least one reticle on which a test pattern is provided, wherein the optical system images the test pattern on the image sensor, and wherein the processing unit is configured to evaluate associated image data from the image sensor of the optical system to determine the modulation transfer function.

9. The apparatus according to claim 1, wherein a reticle is arranged in an image plane of the optical system on which there is a test pattern, wherein the optical system images the test pattern, and the MTF measuring apparatus is configured to evaluate an image of the test pattern to measure the modulation transfer function of the optical system.

10. The apparatus according to claim 1, wherein:
the centering measuring apparatus is configured to measure and determine the first centered state of the center of curvature of the first optical surface of the first optical element of the optical system;
the centering apparatus is configured to subsequently actively center the first optical element based on data relating to the first centered state of the first optical element; and
the centering measuring apparatus is configured to then measure and determine the second centered state of the center of curvature of the second optical surface of the second optical element of the optical system.

11. An apparatus for detecting imaging quality of an optical system, comprising:
an MTF measuring apparatus configured to measure a modulation transfer function at a plurality of field points in an imaging field of the optical system, wherein the MTF measuring apparatus is configured to perform a plurality of off-axis MTF measurements;
a centering measuring apparatus that is arranged on-axis that is configured to measure and determine a first centered state of a center of curvature of a first optical surface of a first optical element of the optical system and then measure and determine a second centered state of a center of curvature of a second optical surface of a second optical element of the optical system that is added to the optical system after measurement and determination of the first centered state of the first optical element; and
a centering apparatus configured to actively center the first optical element and the second optical element relative to each other by displacement perpendicular to a centering axis of the optical system based on the measurements and determinations made by the centering measuring apparatus relating to the first centered state of the first optical element and the second centered state of the second optical element;
wherein the centering measuring apparatus comprises an autocollimator, and
wherein the centering measuring apparatus is configured to measure the first center of curvature of the first optical surface of the first optical element of the optical system in reflection.

12. The apparatus according to claim 11, wherein:
the centering measuring apparatus is configured to measure and determine the first centered state of the center of curvature of the first optical surface of the first optical element of the optical system;
the centering apparatus is configured to subsequently actively center the first optical element based on data relating to the first centered state of the first optical element; and
the centering measuring apparatus is configured to then measure and determine the second centered state of the center of curvature of the second optical surface of the second optical element of the optical system.

* * * * *